United States Patent [19]

Shaw et al.

[11] Patent Number: 4,618,218

[45] Date of Patent: Oct. 21, 1986

[54] RADIATION MODULATING APPARATUS AND METHOD

[75] Inventors: Christopher G. Shaw, Redmond; Ted J. Kramer, Seattle, both of Wash.

[73] Assignee: The Boeing Company, Seattle, Wash.

[21] Appl. No.: 602,140

[22] Filed: Apr. 19, 1984

[51] Int. Cl.4 .............................................. G02B 5/28
[52] U.S. Cl. ..................... 350/363; 350/355; 350/166; 350/1.7
[58] Field of Search ............... 350/355, 363, 3591.5, 350/1.6, 1.7, 163, 164, 356, 166; 257/158A

[56] References Cited

U.S. PATENT DOCUMENTS

| Re. 16,733 | 9/1927 | Jenks . | |
|---|---|---|---|
| 3,153,113 | 10/1964 | Flanagan et al. | 350/363 |
| 3,169,163 | 2/1965 | Nassenstein . | |
| 3,190,177 | 6/1965 | Kaprelian . | |
| 3,245,313 | 4/1966 | Zaromb . | |
| 3,341,274 | 9/1967 | Marks . | |
| 3,374,830 | 3/1968 | O'Sullivan, Jr. . | |
| 3,443,859 | 5/1969 | Rogers . | |
| 3,473,863 | 10/1969 | Lewis . | |
| 3,668,106 | 6/1972 | Ota . | |
| 3,682,528 | 8/1972 | Apfel et al. | 350/1.7 |
| 3,708,220 | 1/1973 | Meyers et al. . | |
| 3,712,710 | 1/1973 | Castellion et al. . | |
| 3,841,732 | 10/1974 | Marks . | |
| 3,971,624 | 7/1976 | Bruesch et al. . | |
| 3,995,940 | 12/1976 | Guyon et al. | 350/363 |
| 4,153,345 | 5/1979 | Duchene et al. | 350/363 |
| 4,461,532 | 7/1984 | Sato et al. | 350/1.6 |

FOREIGN PATENT DOCUMENTS 2121075 12/1983 United Kingdom ................. 350/1.7

*Primary Examiner*—John K. Corbin
*Assistant Examiner*—B. S. Shapiro
*Attorney, Agent, or Firm*—Hughes & Cassidy

[57] ABSTRACT

A pair of planar electrodes spaced from one another by an electrolyte. The front electrode faces the air or vacuum environment and is transparent, and the second electrode is in thermal contact with a heat conducting surface and is reflective. By selectively modifying the voltage between the two electrodes, a partially reflective coating can be deposited on the back face of the front electrode or removed therefrom. With the coating removed, the emission of thermal radiation is minimized, and a major portion of the radiation from sources in the environment is reflected. With the coating present, emitted or reflected radiation interacting with the coating interferes destructively with the radiation emitted or reflected by the second electrode, maximizing thermal emission and absorbing a major portion of any incident radiation.

20 Claims, 4 Drawing Figures

RADIATION MODULATING APPARATUS AND METHOD

BACKGROUND OF THE INVENTION

1. Field of the Invention

The present invention relates to an apparatus and method for selectively modifying the radiation emitting, reflecting, and absorbing characteristics of an apparatus, and more particularly to modifying such characteristics as a means of controlling the amount of heat emitted in the form of such radiation, with the apparatus and method being particularly adapted for use in a spacecraft or the like where control of thermal radiation is the primary method of temperature control.

2. Background Art

Spacecraft and satellites in orbit undergo heating from internal electrical and electronic instrumentation, as well as from solar and planetary radiation. This heat can be radiated away at infrared wavelengths if the hot components are thermally connected to the surfaces of high infrared emittance. When the solar heating is cut off by occultation, or when the on-board instrumentation is in a dormant state, the loss of heat by radiation may cause excessive cooling of components (such as batteries) which cannot tolerate the resulting low temperatures.

A common approach to solving this problem is the use of a louver system, generated by metallic springs which open the low emittance louver blades at higher temperatures to expose a high emittance surface, and close the blades at low temperatures, to retain heat. The weight and size of louver systems are significant drawbacks for use in space. In addition, there are potential problems relating to the reliability of such louver systems.

With regard to other solutions to this problem, U.S. Pat. No. 3,374,830, O'Sullivan Jr., shows a thermal control panel for a space vehicle. This device uses the electro-optical effects of transparent materials to control the amount of absorption or reflection of incident solar radiation. An electrical potential is applied to modify the characteristics of the material.

U.S. Pat. No. 3,341,274, Marks, shows an electrically responsive light controlling device, and one of the uses of the device described in the patent is on the surface of space satellites to modify the radiation absorbing and reflecting characteristics of the device. There is a liquid between two sheets of glass or other material, and a suspension of dipole particles in the liquid. The orientation of these particles is changed by applying an electric field, thus changing the ability of the device to reflect, transmit or absorb light.

Neither of the above two devices can modulate the thermal emittance of spacecraft surfaces, since they basically operate at visible rather than infrared wavelengths. They would control temperature by modulating solar heating, which is an inadequate method for thermal control of spacecraft in many cases.

A search of the patent literature discloses a number of other devices which are related somewhat generally to this broad area of technology, and these are presented below.

U.S. Pat. No. Re. 16,733, Jenks, illustrates an apparatus where there is a mirror located in an electrolytic bath that is connected to a source of oscillating current. A light source of constant intensity is directed through a lens and at the mirror, with the reflection from the mirror being directed toward a film. By reversing the current, the mirror becomes the opposite pole of the oscillating circuit and particles are alternately plated onto and removed from the mirror to change its reflective capacity. The purpose of this is to produce lights and shades and half tones on the photographic surface on which the reflected light impinges.

U.S. Pat. No. 3,153,113, Flanagan et al, shows a window having two glass plates with a transparent electrolyte therebetween. There is a transparent electrode between the two sheets onto which material will coat when current is passed through the electrolyte. There is a second electrode covering only a minor portion of the area between the two window panels. The light passing through the window can be filtered by changing the density of the coating on the electrode which extends fully between the two panels.

U.S. Pat. No. 3,169,163, Nassenstein, discloses a light valve where there are two electrodes defining a space therebetween, and there are two membranes spaced from each other and located between the electrodes, with the membranes and the electrodes defining three regions. The upper and lower region are filled with a solution, such as a saturated solution of silver nitrate, while the middle region is filled with a colloidal solution. The intensity and direction of a light beam directed on the member is controlled by changing the concentration of a dissolved material in the liquid by applying an electric field to the electrodes or membranes immersed in the liquid. This is essentially accomplished by the migration of suspended particles.

U.S. Pat. No. 3,190,177, Kaprelian, shows what are called "electrochemical shutters". There is a pair of spaced transparent electrodes with an electrolyte therebetween. A source of electric power is connected between the electrodes which are successively plated and unplated in an alternating fashion. It is stated that such a device can be used in aerial cameras, and also other applications such as sound recording, tachistoscopic projection and other uses for light valves or modulators.

U.S. Pat. No. 3,245,313, Zaromb, shows what is called a "light valve". There is a container having two transparent walls with a plating solution located between the walls. The patent relates primarily to the circuit for causing the metal in the solution to plate out onto one of the walls, there is an agent for oxidizing the metal when plated out. The patent relates to certain details of the electrical circuitry. The overall function is to either reflect or transmit the light which is directed toward the light valve.

U.S. Pat. No. 3,443,859, Rogers, discloses a variable light transmitting device in an electrolytic system which utilizes a material having reversably alterable spectral absorption characteristics, which is a material that in one environment or in one set of conditions is transparent or possesses a color and which in other conditions has different light absorbing or transmitting characteristics. There is a pair of transparent or at least translucent electrodes, between which is an electrolytic solution. The current is directed through the electrolytic solution to attain the desired spectral absorption change.

U.S. Pat. No. 3,473,863, Lewis, shows a variable light transmitting window, where there are two sheets of glass, each having a transparent electroconductive coating on the interior surface. There is a plastic inner layer serving as an electrolyte, and containing soluble thallium or lead compounds. The light transmission is regulated by applying an electric potential across the inner layer to deposit an oxide coating of lead or thallium on one of the electroconductive coatings.

U.S. Pat. No. 3,668,106, Ota, shows an electrophoretic display device where there is an electrophoretic suspension layer of finely divided powder located between the electrodes. By imposing an electric field across the suspension, the optical reflective properties of the suspension layer is changed by changing the spatial distribution of the material.

U.S. Pat. No. 3,708,220, Meyers, shows an electro-optical device to control absorption of radiation by windows, display devices and the like by providing a sandwich arrangement of electrodes, between which are two identical layers of transition metal electrochromic compounds separated by a semi-solid highly conductive sulfuric acid gel electrolyte. The electromagnetic radiation absorption characteristics are altered by the influence of an electric field applied thereon.

U.S. Pat. No. 3,712,710, Castellion, shows a solid state electrochromic mirror which operates on generally the same principle as U.S. Pat. No. 3,708,220.

U.S Pat. No. 3,841,732, Marks, shows what is called a "dipolar electro-optic structure", which is generally similar to the earlier Marks patent, U.S. Pat. No. 3,341,274, discussed above.

U.S. Pat. No. 3,971,624, Bruesch et al, shows another electrochromic device where there are two electrodes, an electrochromic layer and an adjacent charge carrying-transmitting insulator layer situated between the electrodes. At least one of the electrodes is deposited on a supporting plate and at least one of the electrodes is transparent. The charge carrier transmitting insulator layer is a good ion conductor and functions to almost completely block the flow of electrons. This is used as an indicator.

U.S. Pat. No. 3,995,940, Guyon et al, shows a luminous display device where there is a light source, a uniform layer of semi-reflecting material of small thickness, a uniform layer of transparent material deposited on the semi-reflecting material, and a reflecting layer deposited on at least part of the uniform layer of transparent material. The reflecting layer is used to form the patterns which are intended to be displayed. An electrolytic solution is provided, and this coats out onto the layer to form the patterns. The device is arranged so that there is constructive interference to maximize reflectance. There is a permanent reflecting surface at the front so that the device is always partly reflecting.

SUMMARY OF THE INVENTION

The apparatus of the present invention is arranged to selectively modify emission, absorption, and reflection of radiation within a predetermined wavelength range. The apparatus has a radiation emitting (or receiving) axis along which the apparatus is adapted to be oriented so that the axis is generally parallel to a major path component of the radiation. It has a front side and a rear side relative to said axis, with the front side being adapted to be positioned to emit or initially receive the radiation.

The apparatus comprises a front generally transparent electrode having a front face and a rear face. The electrode occupies a plane having a major alignment component generally perpendicular to the radiation emitting (or receiving) axis.

There is a generally transparent electrolyte positioned behind said front electrode and in electrolytic contact with the rear surface of the front electrode. There is a second electrode positioned to be in electrolytic contact with said electrolyte.

There is a selectively operable voltage source to impose a voltage between the electrodes where the first electrode can be charged either negatively or positively relative to the second electrode to either deposit a partially reflective coating at the rear surface of the first electrode or remove said coating from the rear surface of the electrode.

The apparatus provides a reflective surface spaced behind the rear surface of the first electrode at a predetermined spacing distance relative to the radiation receiving axis.

For the sake of simplicity in explaining the operation of the apparatus, we will explain how the device becomes more or less reflective of radiation incident upon its front surface, keeping in mind that high reflectance implies low absorption of incident radiation and vice versa. By Kirchhoff's law, the fraction of incident radiation absorbed at any wavelength is equal to the fraction of black-body thermal radiation which will be emitted at that wavelength, so high reflectance also implies low thermal emittance and vice versa.

With the coating deposited on the rear surface of the first electrode, a first portion of radiation within the wavelength range that passes through the coating is reflected back from the reflective surface to said coating so as to cause destructive interference with a second portion of radiation being reflected from the coating, so as to reduce total reflection from the apparatus. With the coating removed from the rear surface of the first electrode, a major portion of radiation is reflected by said reflective surface away from the apparatus.

More specifically, in the preferred form, the predetermined spacing distance between the rear surface of the first electrode and the reflecting surface is equal to $\lambda/4n$ where $\lambda$ equals the wavelength within the predetermined wavelength range and "n" equals the refractive index of the electrolyte.

In the preferred embodiment, the second electrode has a generally planar configuration and is positioned rearwardly of the first electrode, with the second electrode providing the reflective surface of the apparatus. Also in the preferred embodiment, the apparatus is mounted to a substrate so as to be in heat conductive relationship therewith, whereby heat transmitted to the apparatus by said substrate can be radiated away on electrical command.

In the method of the present invention, an apparatus is provided such as that indicated above. When it is desired to avoid emitting thermal radiation, the selectively operable voltage source is arranged to eliminate any deposited layer on the rear surface of the first electrode. On the other hand, to dump excess heat to the environment as thermal radiation, the voltage source is operated to cause the coating to be deposited on the rear surface of the first electrode. In this manner, it is possible to maintain the temperature of a substrate or structure with which the apparatus is used within an appropriate temperature limit.

Other features of the present invention will become apparent from the following detailed description.

DESCRIPTION OF THE PREFERRED EMBODIMENT

Figure 1:
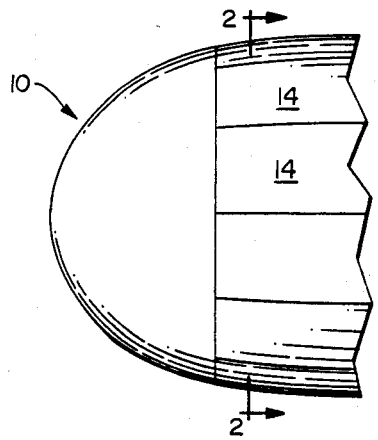
FIG. 1 is a highly schematic side elevational view of a portion of a spacecraft utilizing the present invention.
Figure 2:
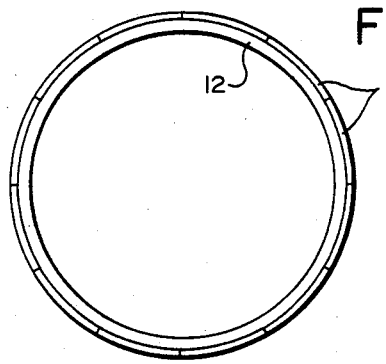
FIG. 2 is a sectional view taken along line 2—2 of FIG. 1.

In FIGS. 1 and 2, there is a highly schematic showing of a portion of a spacecraft 10 having a basic wall structure 12 and a plurality of panels 14 positioned on the wall structure 12 and spaced circumferentially around the spacecraft 10. For purposes of illustration, the thickness of these panels 14 is greatly exaggerated. As will become apparent from the following description, these panels 14 can be made extremely thin and yet function quite effectively in the present invention.

Figure 3:
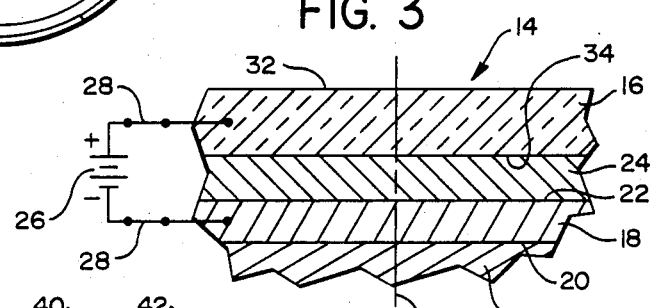
FIG. 3 is a schematic view of the apparatus of the present invention in its low emittance state (i.e. more highly reflective state)

With reference to FIG. 3, there is shown in section a very small portion of one of the panels 14. The panel 14 comprises first and second planar parallel electrodes 16 and 18, respectively. The forward electrode 16 is transparent to radiation of the relevant wavelength, and in its preferred form, is a semi-conductor. The rear electrode 18 is made of a metal having a back surface 20 by which it is attached to or plated on the underlying structure 12 and a front reflective surface 22. The two electrodes 16 and 18 are spaced a short distance from one another, indicated at "a" in FIG. 4, and the space between the two electrodes 16 and 18 is filled with an electrolyte 24. There is a voltage source, indicated schematically at 26, and this is connected by a pair of switching elements 28 to the two electrodes 16 and 18. In the position of FIG. 3, the positive terminal of the voltage source is connected to the front transparent electrode 16, and the negative terminal is connected to the rear metal electrode 18.

For purposes of description (remembering that the primary function is to modulate thermal emittance while reflectance modulation of external radiation is a secondary, although possibly simultaneous, function), the panel 14 can be considered as having a radiation receiving axis 30 which in FIG. 3 is shown as being perpendicular to the parallel planes occupied by the two electrodes 16 and 18. It will be assumed that radiation is received along this axis in a path so that it passes first to the transparent electrode 16 and then through the electrolyte 24 to the rear electrode 18. The term "front" or "forward" will denote proximity to the outermost surface 32 of the front electrode 16, while the term "rear" or "rearward" will denote proximity to the surface 20 of the electrode 18 that is positioned against the wall structure 12. Obviously, with the panels 14 being spaced in a circumferential pattern around a spacecraft, the path of the radiation will deviate from being perfectly parallel to the axis 30. However, for purposes of discussion, it will be assumed that the direction of the radiation is such that it has a major alignment component parallel with the radiation receiving axis 30.

With regard to composition, the material for the front electrode 16 will depend upon the wavelengths of the radiation which will be emitted or received. For example, for infrared radiation from a body at a temperature of 300° K., the wavelengths of peak black-body radiation are in the range of 8 to 12 microns. For these wavelengths, germanium would be a suitable material. For visible light applications, indium-doped tin oxide (ITO) would be suitable.

The electrolyte 24 is desirably a solid super-ionic conductor, such as $RbAg_4I_5$, whose conduction of metal ions greatly exceeds its electronic conductivity. Other electrolytes which could possibly be used include lithium-beta-alumina, sodium-beta-alumina or certain copper-bromine compounds. Standard liquid electrolytes such as sulfuric acid-metal solution could be used where side effects such as gas formation and electrochemical changes are not a major concern, although solid electrolytes are preferred for ruggedness and stability.

With regard to the rear electrode 18, it will be made of a metal whose ions are conducted by the electrolyte. Thus, if the electrolyte is $RbAg_4I_5$, the lower electrode is silver.

Figure 4:
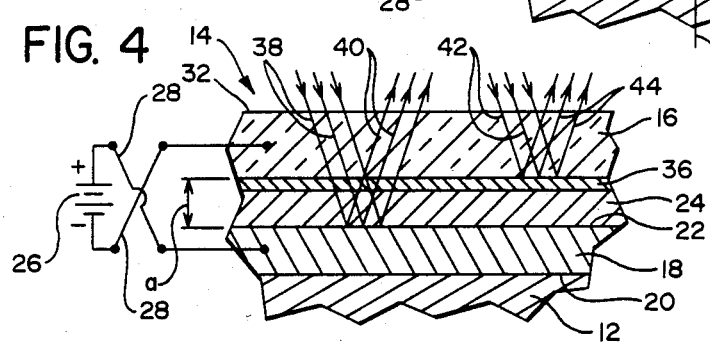
FIG. 4 is a view similar to FIG. 3, but showing the apparatus in its high emittance state.

Each panel 14 is arranged so that it can have a low emittance (high-reflecting) state, such as shown in FIG. 3, or a high emittance state, such as shown in FIG. 4. In the low emittance state, the metal ions are all either suspended in the electrolyte 24 or deposited on the front surface 22 of the rear electrode 18. In this condition, both the front electrode 16 and the electrolyte 24 are substantially transparent to radiation of the relevant wavelengths which are to be modified. Thus, the incoming radiation is reflected from the rear metal electrode 18 back out the front face 32 of the panel 14. This high reflectance corresponds to a low infrared emittance (or low solar absorption for visible wavelengths).

When it is desired to have the panel 14 operate in its high-emittance state, the switching elements 28 are reversed so that the front transparent electrode 16 is at a negative potential relative to the rear metal electrode 18. This makes the front transparent electrode 16 the cathode, and metal ions from the rear electrode 18 are transported by the electrolyte to the interface 34 between the front electrode 16 and the electrolyte 24. This forms a deposited metal layer 36, as shown in FIG. 4. When this layer 36 is of the proper thickness, the switch elements 28 are placed out of contact with the electrodes 16 and 18 so that the deposited layer 36 remains in place. This layer 36 has the very large absorption coefficient typical of metals, but is thin enough to permit a portion of any incident radiation to pass therethrough. The portion of the radiation that passes through the thin deposited metal layer 36 also passes through the electrolyte 24 and is then reflected from the front surface 22 of the rear metal electrode 18 back to the deposited metal layer 36.

A significant feature of the present invention is that the spacing of the electrodes 16 and 18 is selected so that the portion of radiation that is reflected from the surface 22 of the rear electrode 18 cancels the radiation that is reflected from the deposited metal layer 36. This is illustrated in FIG. 4 by showing a first portion of the radiation (represented by the arrows 38) passing through the deposited metal layer 36 and then being reflected outwardly, this being represented by the arrows 40. A second portion of the radiation is indicated by the arrows at 42, and this is reflected from the deposited metal layer 36, with the reflected radiation being indicated by the arrows 44. (It is to be understood, of course, that for purposes of illustration, the two portions of the radiation are shown spaced from each other, while actually the radiation represented by the arrows 38 and 40 would be superimposed over the radiation represented by the arrows 42 and 44.)

If the optical path of the beam 38-40 is such that it travels one-half wavelength further than the beam 42-44 that is reflected from the deposited metal layer 36, then there will be an interference effect where the two beam portions 38-40 and 42-44 will tend to cancel each other so that the reflected radiation is minimized. Further, the beam 38-40 is attenuated by its two passes through the absorbing deposited metal layer 36. To convert the panel 14 from the high emittance state of FIG. 4, it is necessary only to reverse the switching elements 28 back to the position of FIG. 3. Thus, the electrode deposited metal that forms the layer 36 moves back into the electrolyte 24, with a simultaneous plating of the metal onto the rear electrode 18.

If the primary wavelength to be either emitted, reflected, or absorbed is $\lambda$, then the spacing between the electrodes 16 and 18 (which is the thickness of the electrolyte 24) should be $\lambda/4n$, where "n" is the refractive index of the electrolyte. The modulating effect will not be quite as pronounced at slightly different wavelengths or for the angles departing from a path parallel to the radiation axis 30 (i.e. perpendicular to the plate electrodes 16 and 18), but will still be significant.

With regard to the thickness of the deposited metal layer 36, in the high emittance (low-reflecting) state shown in FIG. 4, the thickness will depend on the optical constants of the electrode and the electrolyte materials. For a panel 14 using germanium as the transparent electrode 16 and silver for the metal electrode 18, and with $RbAg_4I_5$ as electrolyte, maximum emittance a wavelenth of 10 microns may be obtained for a thickness on the order of 100 Angstroms.

The rear electrode 18 should be thick enough that the temporary loss of metal through the electrolyte 24 does not affect its electrical or mechanical properties. In general, it would be sufficient for the metal electrode 18 to have a thickness dimension of a few thousand Angstroms.

The thickness of the front electrode 16 may be varied to optimize the operation of the panel 14. It may be necessary to apply an antireflecting coating over the front surface 32, especially if it has a high refractive index (as in the case of germanium).

From the above discussion, it can be appreciated that the panel 14 could be made of a very small overall thickness, and could be made largely of vapor-deposited materials whose weight and volume are extremely small compared to a system such as a louver system. The solid state configuration of the present invention has no moving parts, thus adding to the reliability of the system. Further, while the device is shown on panels 14 of relatively large size, it could be arranged in a mosaic of small squares or other shapes and it could easily be applied to curved surfaces.

To review the overall operation of the present invention, let it be assumed that the spacecraft 10 is in a state of low on-board activity, where too much radiation of thermal energy to space could cause undesirably low on-board temperatures. In this situation, the panels 14 which are releasing such radiation would be placed in the low emittance state of FIG. 3 by having the switching elements positioned so that there is no deposited metal at the interface 34 between the electrolyte 24 and the front electrode 16. In this state, the emission of radiation is minimized and spacecraft temperatures maintained at a sufficiently warm level.

However, let it be assumed that to maintain the overall temperature of the spacecraft 10 below a certain maximum level when the spacecraft is in a state of high activity with large internal heating, it is desired to emit more thermal radiation to space. In this situation, the switching elements 28 are moved to the configuration of FIG. 4, until a suitable thickness of a metal layer 36 is deposited at the interface 34 between the electrolyte 24 and the front electrode 16. As described previously herein, the thickness of the deposited metal layer 36 is selected to minimize surface reflectance by destructive interference, thus maximizing the emittance of thermal radiation by Kirchhoff's Law. With the panel 14 being extremely thin, internal heat arriving at the supporting wall structure 12 is almost immediately transferred to the panel 14 and radiated away.

Further, it should be noted that although the present invention has been described with reference to a spacecraft thermal control system, within the broader aspects of the present invention, it could be used in other applications requiring an electro-optical modulator for wavelengths through various portions of the electromagnetic spectrum. Also, the configuration and materials recited herein are by way of example, and it is to be understood that there could be other modifications to these which would still be within the scope of the present invention.

We claim:

1. An apparatus to selectively modify emission or absorption of radiation within a predetermined wavelength range and also modify reflection of radiation within said predetermined wavelength range, said apparatus having a radiation emitting or receiving axis along which said apparatus is adapted to be oriented so that the axis is generally parallel to a major path component of the radiation, said apparatus having a front side and a rear side relative to said axis, with the front side adapted to be positioned to emit or initially receive the radiation, said apparatus comprising:

a. a front substantially transparent electrode having a front face and a rear face, and occupying a plane having a major alignment component substantially perpendicular to said radiation emitting or receiving axis;

b. a substantially transparent electrolyte positioned behind said front electrode and in electrolytic contact with the rear face of the front electrode;

c. a second electrode positioned to be in electrolytic contact with said electrolyte;

d. a selectively operable voltage source to impose a voltage between said electrode where the first electrode can be charged either negatively or positively relative to the second electrode to either deposit a partially reflective coating at the rear surface of the first electrode or remove said coating from the rear surface of said electrode;

e. said apparatus providing a substantially fully reflective surface spaced behind the rear surface of the first electrode at a predetermined spacing distance along said radiation emitting/receiving axis, whereby with the coating deposited on the rear face of the first electrode, destructive optical interference minimizes surface reflectance of the reflective surface and thus maximizes surface emittance of said apparatus, and with said coating being removed from the rear face of the first electrode, the surface reflectance of the reflective surface is maximized and thus the surface emittance is minimized.

2. The apparatus as recited in claim 1, wherein said predetermined spacing distance is equal to $\lambda/4n$, where:
   a. $\lambda$ equals the wavelength within the predetermined wavelength range;
   b. n equals the refractive index of the electrolyte.

3. The apparatus as recited in claim 2, wherein said second electrode has a generally planar configuration and is positioned rearwardly of said first electrode with said second electrode providing the reflective surface of the apparatus.

4. The apparatus as recited in claim 1, wherein said second electrode has a generally planar configuration and is positioned rearwardly of said first electrode with said second electrode providing the reflective surface of the apparatus.

5. The apparatus as recited in claim 1, wherein said apparatus is mounted to a substrate so as to be in heat conductive relationship therewith, whereby heat can be transmitted by said substrate to said apparatus and radiated away to the surrounding environment.

6. The apparatus as recited in claim 1, wherein:
   a. said second electrode has a generally planar configuration and is positioned rearwardly of said first electrode with said second electrode providing the reflective surface of the apparatus;
   b. said apparatus is mounted to a substrate so as to be in heat conductive relationship therewith, whereby heat may be transmitted by said substrate to said apparatus and radiated away to the surrounding environment.

7. The apparatus as recited in claim 6, wherein said predetermined spacing distance is equal to $\lambda/4n$, where:
   a. $\lambda$ equals the wavelength within the predetermined wavelength range;
   b. n equals the refractive index of the electrolyte.

8. The apparatus as recited in claim 6, wherein said second electrode comprises a metal having said reflective surface, and said metal is deposited through said electrolyte to form said partially reflective coating.

9. The apparatus as recited in claim 8, wherein the metal for the second electrode comprises silver.

10. A heat control apparatus to control heat contained in a structure by selectively modifying emission or absorption of radiation within a predetermined wave length range and also modify reflection of radiation within said predetermined wavelength range, said apparatus having a radiation emitting/receiving axis along which said apparatus is adapted to be oriented so that the axis is generally parallel to a major path component of the radiation, said apparatus having a front side and a rear side relative to said axis, with the front side adapted to be positioned to emit or initially receive the radiation, said apparatus comprising:
   a. a front substantially transparent and generally planar electrode having a front face and a rear face, and occupying a plane having a major alignment component substantially perpendicular to said radiation receiving axis;
   b. a substantially transparent electrolyte positioned behind said front electrode and in electrolytic contact with the rear surface of the front electrode;
   c. a second substantially planar electrode positioned behind said electrolyte so as to be in electrolytic contact therewith and having a forwardly facing substantially fully reflective surface, and a rear surface in heat exchange contact with said structure;
   d. a selectively operable voltage source to impose a voltage between said electrodes where the first electrode can be charged either negatively or positively relative to the second electrode to either deposit a partially reflective coating at the rear face of the first electrode or remove said coating from the rear face of said electrode;
   e. the reflective surface of the second electrode being spaced behind the rear face of the first electrode at a predetermined spacing distance relative to said radiation emitting/receiving axis, whereby with the coating deposited on the rear face of the first electrode, destructive optical interference minimizes surface reflectance of the reflective surface and thus maximizes surface emittance of said apparatus, and with said coating being removed from the rear face of the first electrode, the surface reflectance is maximized and thus the surface emittance is minimized.

11. The apparatus as recited in claim 10, wherein said predetermined spacing distance is equal to $\lambda/4n$, where:
   a. $\lambda$ equals the wavelength within the predetermined wavelength range;
   b. n equals the refractive index of the electrolyte.

12. The apparatus as recited in claim 10, wherein said second electrode comprises a metal having said reflective surface, and said metal is deposited through said electrolyte to form said partially reflective coating.

13. The apparatus as recited in claim 12, wherein the metal for the second electrode comprises silver.

14. A method of selectively modifying emission or absorption of radiation within a predetermined wavelength range and also modifying reflection of radiation within said predetermined wavelength range, where there is a radiation emitting or receiving axis along which said radiation is directed, said method comprising:
   a. providing a front substantially transparent electrode having a front face and a rear face, and occupying an alignment plane;
   b. providing a substantially transparent electrolyte positioned immediately behind said front electrode and in electrolytic contact with the rear face of the front electrode;
   c. providing a second electrode positioned to be in electrolytic contact with said electrolyte;
   d. locating a reflective surface behind the rear face of the first electrode at a predetermined spacing distance relative to the radiation emitting or receiving axis and substantially parallel to said plane;
   e. locating said two electrodes, said electrolyte, and said reflective surface so that said plane is perpendicular to a major alignment component of said radiation emitting/receiving axis;
   f. selectively applying a voltage source between said first and second electrodes to cause a coating of the second electrode to be deposited on the rear face of the first electrode, with the result that destructive optical interference minimizes surface reflectance of the reflective surface and thus maximizes surface emittance of said apparatus, and then applying said voltage source to the electrodes to remove the coating from the rear face of the first electrode so that the surface reflectance of the reflective surface is maximized and thus the surface emittance is minimized.

15. The method as recited in claim 14, wherein said reflective surface is spaced from the rear surface of the first electrode by a distance equal to $\lambda/4n$, where:
  a. $\lambda$ equals the wavelength within the predetermined wavelength range;
  b. $n$ equals the refractive index of the electrolyte.

16. The method as recited in claim 15, wherein said second electrode is provided in the form of a generally planar configuration and is positioned rearwardly of the first electrode with the second electrode providing the reflective surface of the apparatus.

17. The method as recited in claim 14, wherein said second electrode is provided in the form of a generally planar configuration and is positioned rearwardly of the first electrode with the second electrode providing the reflective surface of the apparatus.

18. The method as recited in claim 14, wherein said electrodes and said electrolyte are placed in heat exchange relationship with a structure which is a substrate for said second electrode, and said coating is deposited or removed from the rear face of the first electrode to increase or decrease emission of radiant energy to control heat of said substrate.

19. The method as recited in claim 14, wherein:
  a. said second electrode is provided in the form of a generally planar configuration and is positioned rearwardly of the first electrode with the second electrode providing the reflective surface of the apparatus;
  b. said electrodes and aaid electrolyte are placed in heat exchange relationship with a structure which is a substrate on which said second electrode is placed, and said coating is deposited or removed from the rear face of the first electrode to increase or decrease emission of radiant energy to control heat of said substrate.

20. The method as recited in claim 14, wherein said second electrode comprises a metal having said reflective surface, and the metal is deposited through said electrolyte to form said partially reflective coating.

* * * * *